United States Patent
Shin et al.

(10) Patent No.: US 10,423,607 B2
(45) Date of Patent: Sep. 24, 2019

(54) METHOD AND APPARATUS FOR MODULO SCHEDULING

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Jang-seop Shin, Anyang-si (KR); Yun-heung Paek, Seoul (KR); Min-Wook Ahn, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 1140 days.

(21) Appl. No.: 14/687,284

(22) Filed: Apr. 15, 2015

(65) Prior Publication Data
US 2016/0070594 A1 Mar. 10, 2016

(30) Foreign Application Priority Data

Sep. 5, 2014 (KR) .................. 10-2014-0119362

(51) Int. Cl.
*G06F 9/44* (2018.01)
*G06F 16/23* (2019.01)
*G06F 16/2458* (2019.01)
*G06F 16/901* (2019.01)

(52) U.S. Cl.
CPC ...... *G06F 16/2379* (2019.01); *G06F 16/2462* (2019.01); *G06F 16/9024* (2019.01)

(58) Field of Classification Search
CPC .................................. G06F 16/2379
USPC ............................................. 717/161
See application file for complete search history.

(56) References Cited

U.S. PATENT DOCUMENTS

| | | | | |
|---|---|---|---|---|
| 5,640,319 A | * | 6/1997 | Beuning | H04Q 3/0029 379/219 |
| 5,664,193 A | * | 9/1997 | Tirumalai | G06F 8/4452 712/241 |
| 6,438,747 B1 | * | 8/2002 | Schreiber | G06F 8/452 717/160 |
| 6,633,817 B1 | * | 10/2003 | Walker | G16B 30/00 702/19 |
| 8,266,610 B2 | | 9/2012 | Martin | |
| 8,745,608 B2 | | 6/2014 | Kim et al. | |
| 8,869,129 B2 | | 10/2014 | Oh et al. | |

(Continued)

FOREIGN PATENT DOCUMENTS

KR 1020100084898 A 7/2010
KR 1020100089350 A 8/2010

OTHER PUBLICATIONS

Title: SCC based Modulo Scheduling for Coarse-Grained Reconfigurable Processors, author: Kim et al, source: IEEE, dated 2012.*

(Continued)

*Primary Examiner* — Chameli Das
(74) *Attorney, Agent, or Firm* — Sughrue Mion, PLLC

(57) ABSTRACT

Provided is a modulo scheduling method. The modulo scheduling method includes conducting a search, based on a data dependency graph of a loop, for a recurrence in which a sum of iteration distances between command nodes is less than a predetermined critical value; and determining a processing order of the recurrence.

14 Claims, 6 Drawing Sheets

(56) References Cited

U.S. PATENT DOCUMENTS

| | | | |
|---|---|---|---|
| 2003/0033582 A1* | 2/2003 | Klein | G06F 17/30958 716/136 |
| 2005/0108001 A1* | 5/2005 | Aarskog | G06F 17/271 704/10 |
| 2006/0048123 A1 | 3/2006 | Martin | |
| 2007/0198971 A1* | 8/2007 | Dasu | G06F 8/433 717/140 |
| 2007/0288911 A1* | 12/2007 | Martin | G06F 8/4452 717/141 |
| 2008/0208559 A1* | 8/2008 | Koelbl | G06F 17/504 703/16 |
| 2009/0013316 A1* | 1/2009 | Martin | G06F 8/4452 717/161 |
| 2009/0180713 A1* | 7/2009 | Bucha | G06T 3/0012 382/300 |
| 2009/0195401 A1* | 8/2009 | Maroney | G06K 9/00335 340/686.6 |
| 2010/0111396 A1* | 5/2010 | Boucheron | G06K 9/0014 382/133 |
| 2010/0185839 A1* | 7/2010 | Oh | G06F 8/451 712/241 |
| 2010/0199069 A1* | 8/2010 | Kim | G06F 9/3897 712/30 |
| 2011/0022638 A1* | 1/2011 | Jiang | G06F 16/683 707/797 |
| 2012/0130632 A1* | 5/2012 | Bandyopadhyay | G01C 17/38 701/446 |
| 2014/0229473 A1* | 8/2014 | Mehrotra | G06F 16/3347 707/728 |
| 2014/0282574 A1* | 9/2014 | Marathe | G06F 9/4881 718/103 |

OTHER PUBLICATIONS

Title: Algorithm transformation techniques for concurrent processors, author: KK Parhi dated: 1989, source: IEEE.*

Title: Algorithms for parallel machine scheduling: a case study of the tracking and data relay satellite system, author: S Rojanasoonthon et al, dated: 2003.*

* cited by examiner

METHOD AND APPARATUS FOR MODULO SCHEDULING

CROSS-REFERENCE TO RELATED APPLICATION

This application claims priority from Korean Patent Application No. 10-2014-0119362, filed on Sep. 5, 2014 in the Korean Intellectual Property Office, the disclosure of which is incorporated herein in its entirety by reference.

BACKGROUND

1. Field

Apparatuses and methods consistent with exemplary embodiments relate to reducing execution time of scheduling with a module, and more specifically, efficiently searching for a recurrence within a data dependency graph by software-pipelined scheduling with a module.

2. Description of the Related Art

A digital signal processor includes instructions programmed in a loop that repeatedly operates on the same data set. In order to enhance a processing speed of the loop, loop level parallelism (LLP) is frequently used. A representative example of LLP is software pipelining.

Software pipelining may simultaneously process a loop including multiple operations if there is no dependency between iterations in the loop which repeats the multiple operations. Thus, different repetitions may be processed in parallel by performing a subsequent iteration i+1 before a current iteration i is finished.

The software pipelining is used to optimize the loop by minimizing an initiation interval II which denotes a time interval between a start point of the iteration i and a start point of the subsequent iteration i+1.

A representative example of software pipelining is modulo scheduling. However, a lot of time is spent in searching for a recurrence in the data dependency graph in the modulo scheduling method, and thus, the total modulo scheduling performance time deteriorates.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments include a method and apparatus for reducing the total modulo scheduling time by efficiently performing a recurrence search which occupies the largest amount of time in the modulo scheduling.

One or more exemplary embodiments include a computer-readable recording medium having recorded thereon a program for executing the above method in a computer.

According to an aspect of an exemplary embodiment, a modulo scheduling apparatus includes: a recurrence search unit configured to conduct a search, based on a data dependency graph of a loop, for a recurrence in which a sum of iteration distances between command nodes is less than a predetermined critical value; and a scheduling unit configured to determine a processing order of the recurrence.

The modulo scheduling apparatus may further include a data dependency graph acquisition unit configured to obtain the data dependency graph indicating dependency between the command nodes included in the loop.

The iteration distances may correspond to a number of iterations that separate two operation instances of a same command node between which dependency exists in the loop.

When a source node is S, the recurrence search unit may search for a recurrence which is a route for returning to the source node S after starting from the source node S, initialize an available iteration distance as the critical value before starting the search, update the available iteration distance while reducing the iteration distance while searching for a recurrence in a direction of one or more successive nodes of the source node S, and stop the search if the available iteration distances become less than 0.

The recurrence search unit may recursively visit a non-visited successive node when the search is stopped.

When a currently visited node is V, a successive node of the node V may be W, and an iteration distance existing between the node V and the successive node W may be D, the recurrence search unit may not perform a search in the direction of the successive node W if the successive node W is not the source node S and the available iteration distance is D or less.

When a currently visited node is V, a successive node of the node V may be W, an iteration distance existing between the node V and the successive node W may be D, and a sum of iteration distances existing on a route to reach the source node S from the node W may be A, the recurrence search unit may not perform a search in a direction of the successive node W if the available iteration distance is less than a sum of D and A.

When a currently visited node is V, a successive node of the node V may be W, the recurrence search unit may not perform a search in a direction of the node W if the node W is not a source node and the node W has already been stored in a route of a current point time.

The scheduling unit may perform scheduling so that the one or more found recurrences may be processed in an order of a largest minimum initiation interval (MII) to a smallest MII, wherein the MII may be a minimum interval which is needed in repeatedly processing each of the recurrences.

According to another aspect of an exemplary embodiment, a modulo scheduling method includes: conducting a search, based on a data dependency graph of a loop, for a recurrence in which a sum of iteration distances between command nodes is less than a predetermined critical value; and determining a processing order of the recurrence.

The modulo scheduling method may further include obtaining the data dependency graph that indicates dependency between the command nodes included in the loop.

When a source node is S, the conducting the search may include searching for a recurrence which is a route for returning to the source node S after starting from the source node S, initialize an available iteration distance as the critical value before starting the search, update the available iteration distance while reducing the iteration distance while searching for a recurrence in a direction of one or more successive nodes of the source node S while reducing the iteration distance, and stop the search if the available iteration distances become less than 0.

The conducting the search may further include recursively visiting a non-visited successive node when the search is stopped.

When a currently visited node is V, a successive node of the node V may be W, and an iteration distance existing between the node V and the successive node W may be D, the conducting the search may not perform a search in the direction of the successive node W if the node W is not the source node S and the available iteration distance is D or less.

When a currently visited node is V, a successive node of the node V may be W, an iteration distance existing between the node V and the successive node W may be D, and a sum of iteration distances existing on a route to reach the source node S from the node W may be A, the conducting the search may not perform a search in a direction of the successive node W if the available iteration distance is less than a sum of D and A.

When a currently visited node is V, a successive node of the node V may be W, the conducting the search may not perform a search in a direction of the node W if the node W is not a source node and the node W has already been stored in a route up of a current point time.

The determining of the process order may perform scheduling the one or more found recurrences in an order of a largest minimum initiation interval (MII) to a smallest MII, wherein the MII may be a minimum interval which is needed in repeatedly processing each of the recurrences.

According to another aspect of an exemplary embodiment, a non-transitory computer-readable recording medium may store a program that is executable by a computer to perform the modulo scheduling method.

BRIEF DESCRIPTION OF THE DRAWINGS

The above and/or other aspects will be more apparent by describing certain exemplary embodiments with reference to the accompanying drawings in which.

DETAILED DESCRIPTION

Figure 1:
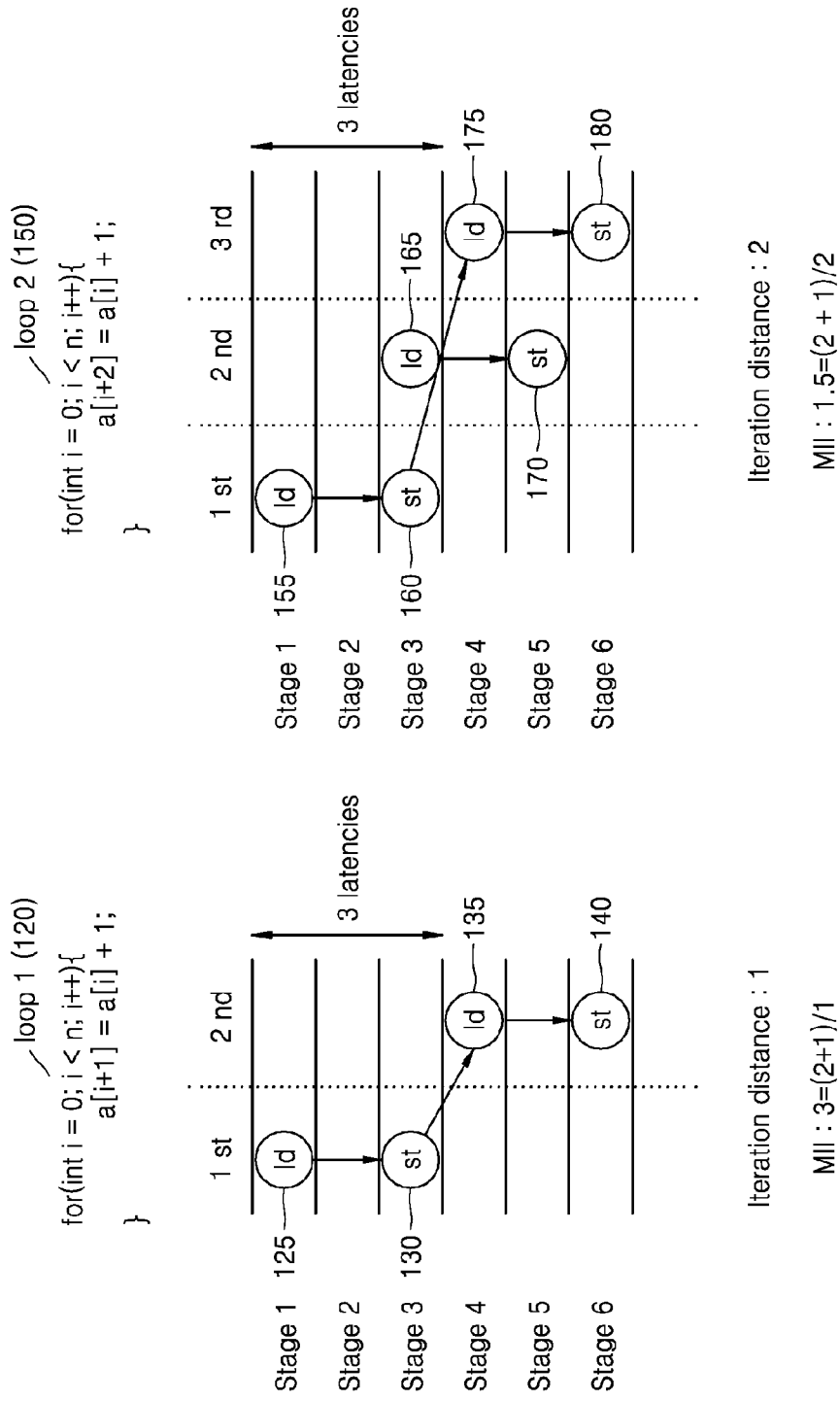
FIG. 1 illustrates a minimum initiation interval (MII) of a loop.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail. As used herein, the term "and/or" includes any and all combinations of one or more of the associated listed items.

FIG. 1 illustrates a minimum initiation interval (MII) of a loop.

Dependency or dependent relation refers to an order in which data, commands, or instructions are executed. If a command (also referred to as "instruction") to be processed has dependency, i.e., when the result of processing a specific command becomes an input of another command, the command is executed in the order which is originally specified. Hence, such commands cannot be processed in parallel or be overlapped when executed.

A data dependency graph is expressed with edge weight, i.e., a latency and an iteration distance. The latency refers to a clock cycle which is required to obtain an operation result for each type of commands. The iteration distance refers to the number of iterations which are performed until it may be possible to perform another command, which depends on the result of processing a predetermined command, after processing the predetermined command which is included in a recurrence. In other words, the iteration distance indicates the number of iterations separating two instances of a same operation between which dependency exists. For example, the iteration distance between node 160 and node 175 is 2 because node 175 of the third iteration needs the output of the first iteration.

A loop contains a recurrence if an instruction in one iteration of the loop is dependent on the same instruction from a previous iteration. The recurrence refers to a set of commands (i.e., nodes) which form a cycle within the data dependency graph. Hence, the total sum of the iteration distances in the recurrence refers to the number of iterations which are performed until the source node (i.e., command) within the recurrence is repeatedly performed.

The minimum initiation interval (MII) of the recurrence is the trunk included in the recurrence, i.e., the sum of latencies divided by the sum of iteration distances. That is, the MII is a time or a cycle which is needed until one recurrence is repeated. Hence, for example, when the data dependency graph includes a recurrence having a minimum start interval, 2, the loop cannot be repeated with a shorter cycle than the minimum start interval.

Respective nodes of FIG. 1 which are displayed as circles refer to commands to be processed by a processor, and vertical intervals between stages, refer to a time needed in processing one command, i.e., latency. Further, each node may refer to a predetermined command, and each node may be described as a command defined by the node.

A first loop 120 is a loop which stores the sum of a[i] and 1 in a[I+1] while incrementing the variable i. In the first iteration (i=0), the operation of storing the value of a[0]+1 in a[1] is performed, and thus, the processor loads a[0] from a memory (125) and stores the result of adding 1 to a[0] in a[1] (130). In the second iteration (i=1), the processor loads a[1] from the memory (135) and stores the result of adding 1 to a[1] in a[2] (140). The value of a[1], which the processors loads from the memory in the second iteration, is determined in the first iteration, and thus, the second iteration may be performed after the first iteration is completed. That is, the first iteration and the second iteration are not processed in parallel.

That is, node 130 of the first loop depends on the output of node 125, and node 135 depends on the output of node 130. Hence, node 125, node 130, and node 135 form a cycle, and a set of nodes (i.e., commands), which form such a cycle, is called a recurrence.

The total sum of latencies, which are spent in the recurrence of the first loop composed of node 125, node 130, and node 135, is determined as follows: The recurrence of the first loop has a latency of 3 because a second instance of the load command is processed (135) after a first instance of the load command (125), and one iteration distance is required. In other words, three stages are needed from the start in the source node to the return of the source node in the recurrence of the first loop, and the total sum of the iteration distances is 1. Hence, because the minimum time interval of the first loop is 3, it means that the iteration is repeated with the cycle of 3 minimum latencies.

A second loop 150 is a loop which stores the sum of a[i] and 1 in a[i+2] while incrementing the variable i.

In the first iteration (i=0), the operation of storing the value of a[0]+1 in a[2] is performed, and thus, the processor loads a[0] from the memory (155), adds 1 to a[0], and stores the result of addition in a[2] (160). The storage command 160 uses the value of the loaded a[0], and thus, the storage command 160 depends on the load command 155.

In the second iteration (i=1), the processor loads a[1] from the memory (165) and adds 1 to a[1], and stores the sum in a[3] (170). The value of a[1] is not determined in the first iteration, and thus, the processor may process the storage command 160 and the load command 165 in parallel without waiting until the first iteration is completed.

In the third iteration (i=2), the operation of storing the value of a[2]+1 in a[4] is performed, and thus, the processor loads a[2] from the memory (175) and stores the sum of a[2] and 1 in a[4] (180). a[2] is determined in the first iteration, and thus, the load command 175 of the third iteration is not processed in parallel with the storage command 160 of the first iteration. In other words, the third iteration may be performed only after the first iteration is completed, and thus, the load command 175 depends on the output of the storage command 160.

Hence, node 160 depends on node 155 and node 175 depends on node 160, and thus node 155, node 160, and node 175 form a cycle and correspond to a recurrence. As in the first loop 130, the total sum of latencies and iteration dependencies of the recurrence of the second loop 150 may be calculated. The total sum of latencies is 3, and the total sum of iteration dependencies is 2 because two iterations are required to execute the source node 175 of stage 4. Hence, the minimum start interval of the second loop is 3/2, and the repeated operation is performed with the cycle of 1.5 minimum latencies.

Figure 2:
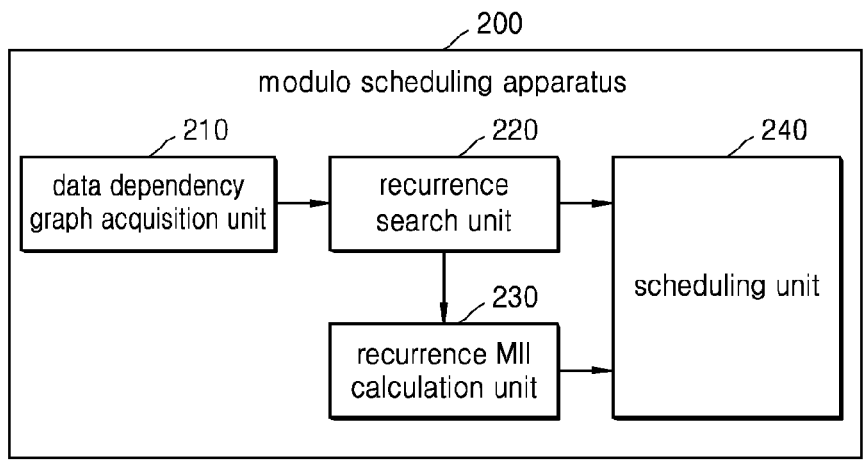
FIG. 2 illustrates a modulo scheduling apparatus according to an exemplary embodiment.

FIG. 2 illustrates a modulo scheduling apparatus 200 according to an exemplary embodiment.

The modulo scheduling apparatus 200 may include a data dependency graph acquisition unit 210, a recurrence search unit 220, a recurrence MII calculation unit 230, and a scheduling unit 240.

The data dependency graph acquisition unit 210 may obtain a data dependency graph showing dependency between commands. The analysis on the dependency relation between commands is an important operation in a parallel process such as software pipelining.

The data dependency graph acquisition unit 210 may indicate a command to be processed by the processor as a node, dependency existing between commands as a direction arrow, and a time (i.e., latency) needed in processing commands as a weight, but an embodiment is not limited thereto.

The recurrence search unit 220 may search for a recurrence in the obtained data dependency graph. As described above, the recurrence is a set of commands which form a cycle in the data dependency graph. The recurrence search unit 220 may search for all recurrences existing in the data dependency graph or may selectively search for recurrences which satisfy a predetermined condition, which will be described later with reference to FIGS. 5, 6, and 7.

The recurrence's MII calculation unit 230 may calculate the MII of each recurrence which meets the predetermined condition. As described above, the MII of the recurrence refers to the trunk included in the recurrence, i.e., the sum of latencies divided by the sum of iteration distances. Hence, for example, when a recurrence has a minimum start interval, A, and is included in the data dependency graph, the loop cannot be repeated with a shorter cycle than the minimum start interval A.

The modulo scheduling apparatus 200 may schedule the iterations of the loop to be repeated with the shortest possible cycle, and thus, the scheduling unit 240 may determine the processing order of the recurrence by using the MII which has been calculated in the recurrence MII calculation unit 230.

The scheduling unit 240 may determine the processing order of the searched recurrences and may determine the order of commands included in each of the searched recurrences.

The scheduling unit 240 may first schedule the recurrences existing in the loop body. Respective repetitions of the loop are performed with a certain cycle interval due to dependency, and this interval is called an initiation interval II. Unlike other nodes, the recurrence has a restriction that the schedule needs to be completed within the initiation interval cycle, and thus, the scheduling unit 240 may perform scheduling with a priority in the recurrence before other operations in the loop body occupy the resource.

Further, the scheduling unit 240 may arrange one or more recurrences in the order of the Mils, and the scheduling may be performed from the recurrence having the largest MII. If the scheduling of commands, which belong to a recurrence having a large MII, is delayed due to the occupation of hardware resources by another command, all the following commands are also delayed, and thus, the performance in the iteration may also fail in the given initiation interval II.

According to an exemplary embodiment, the scheduling unit 240 may schedule commands in consideration of the analyzed memory dependency while increasing the initiation interval II value from the calculated MII. For example, the scheduling unit 240 may find the quickest cycle of the iteration while incrementing the initiation interval II value starting from the MII value by trial and error. However, the scheduling unit 240 may also use methods for calculating the II value other than such a trial-and-error method.

The scheduling unit 240 may obtain a prologue or epilogue of a software-pipelined loop.

Figure 3:
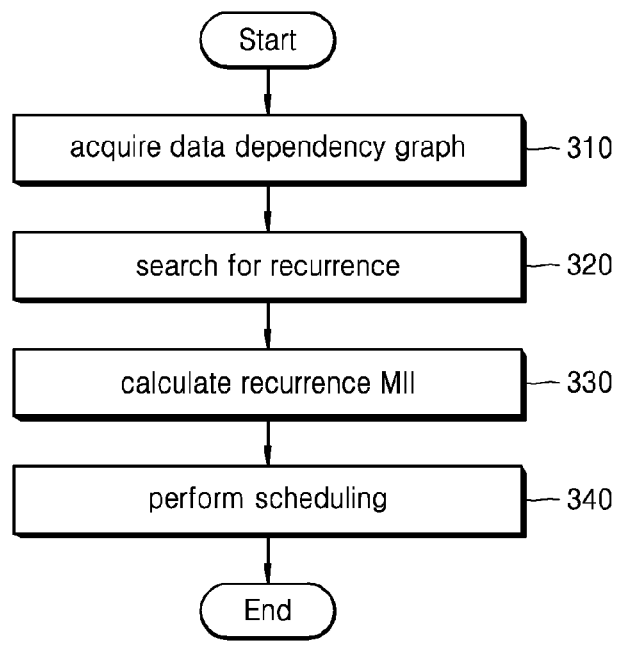
FIG. 3 is a flowchart of a modulo scheduling method according to an exemplary embodiment.

FIG. 3 is a flowchart of a modulo scheduling method according to an exemplary embodiment.

The modulo scheduling method described with reference to FIG. 3 is performed in the modulo scheduling apparatus 200 illustrated in FIG. 2. Hence, the above description of the modulo scheduling apparatus 200 with reference to FIG. 2 is also applied to the modulo scheduling method according to an embodiment of FIG. 3.

In operation S310, the modulo scheduling apparatus 200 may obtain a data dependency graph indicating dependency between commands. In operation S310, the modulo scheduling apparatus 200 may indicate a command to be processed by the processor as a node, dependency existing between commands as a direction arrow, and a time needed in processing commands (i.e., latency) as a weight, but an embodiment is not limited thereto.

In operation S320, the modulo scheduling apparatus 200 may search for a recurrence within the data dependency graph. The recurrence is a set of commands which form a cycle within the data dependency graph. The recurrence search in the data dependency graph occupies the greatest performance time in the total modulo scheduling, and thus, the modulo scheduling apparatus 200 may reduce the total performance time of the modulo scheduling by selectively searching for the recurrence which satisfies a predetermined condition instead of searching for all recurrences existing in the data dependency graph, which will be described later with reference to FIGS. 5, 6, and 7.

In operation S330, the modulo scheduling apparatus 200 may calculate the MII of each of the searched recurrences. As described above, the MII refers to the trunk included in the recurrence, i.e., the sum of latencies divided by the sum of iteration distances.

In operation S340, the modulo scheduling apparatus 200 may determine the order of commands included in each of the searched recurrences or determine the order of the searched recurrences.

In operation S340, the modulo scheduling apparatus 200 may arrange one or more recurrences by iteration intervals (II) and may first schedule the command included in the recurrence having the largest MII.

In operation S340, the modulo scheduling apparatus 200 may find the quickest cycle of the iteration while incrementing the II value starting from the MII value by trial and error.

In operation S340, the modulo scheduling apparatus 200 may obtain a prolog and an epilogue, and the loop trip count may be adjusted.

Figure 4:
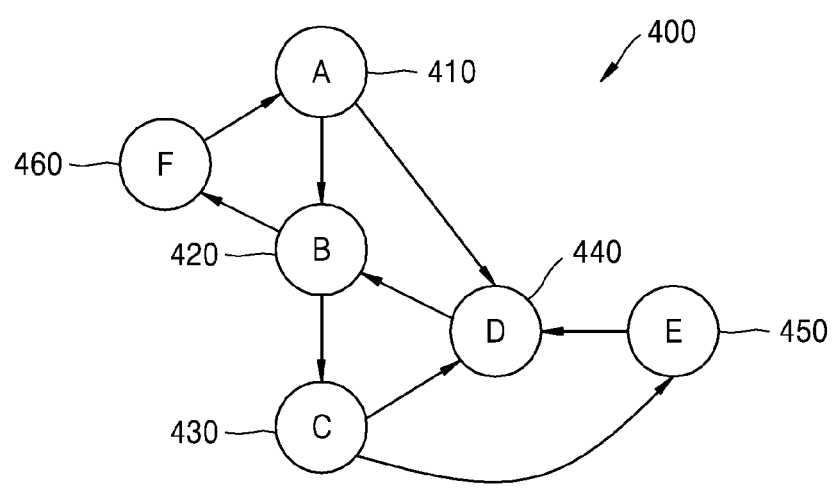
FIG. 4 is a data dependency graph according to an exemplary embodiment.

FIG. 4 is a data dependency graph according to an exemplary embodiment.

As described above, the data dependency graph acquisition unit 210 of the modulo scheduling apparatus 200 may obtain a data dependency graph 400 indicating dependency between commands. Each direction arrow of the data dependency graph 400 of FIG. 4 may indicate dependency, and each node may indicate a command. Hereinafter, the description "node A is processed" refers to "the processor executes command A in a loop."

For example, node F 460 may be processed after node B 420 is processed, and node D 440 may be processed after node A 410, node C 430, and node E 450 are processed.

As described above, the recurrence MII calculation unit 230 of the modulo scheduling apparatus 200 needs an operation of calculating the MII by searching for each recurrence existing in the data dependency graph in order to repeat the iteration of the loop at the shortest possible cycle, and thus, the recurrence search unit 220 may need to search for the recurrence existing in the data dependency graph 400.

The recurrence search unit 220 may search for a recurrence formed by a closed curve that starts from a source node and returns to the source node. More specifically, when the source node is designated as node A 410, the searched recurrence may be a route that starts from node A 410, passes intermediate nodes to which arrows started from node A 140 are directed, and ends with node A 410. The recurrence search unit 220 may determine Paths {A, B, F, A} and {A, D, B, F, A} existing in the data dependency graph 400 as a recurrence that is to be output. The recurrence search unit 220 may determine that Path {A, B, C, D, B, F, A} is not a recurrence because the Path redundantly includes node B, which will be described later with reference to FIGS. 5, 6, and 7.

The recurrence search unit 220 may use various search algorithms and data structures such as a stack and queue, and a connection list. According to an exemplary embodiment, the modulo scheduling apparatus 200 may use a Johnson algorithm in order to efficiently search for a recurrence existing in the data dependency graph.

According to an exemplary embodiment, the recurrence search unit 220 may narrow its search to find certain recurrences among all recurrences existing in the data dependency graph 400 to reduce complexity.

According to an exemplary embodiment, if the recurrence search unit 220 searches for all recurrences existing in the data dependency graph by using a Johnson algorithm, the time complexity is $O((n+e)(c+1))$, and thus, in the worst case, the complexity may be $2^n$ (n is the number of commands, where e is the data dependency between commands (number of trunks), and c is the number of recurrences in the data dependency graph).

According to an exemplary embodiment, the recurrence search unit 220 may reduce the time and costs which are spent in searching for a recurrence by selectively searching for only recurrences having an MII that is relatively long. The scheduling unit 240 does not necessarily search for all recurrences within the data dependency graph in scheduling.

The MII of the recurrence is the total sum of latencies of all trunks of the recurrence divided by the total sum of iteration distances, as shown in Equation 1 below.

$$MII = \frac{\sum_{k \in recurrence} \text{latency}(k)}{\sum_{k \in recurrence} \text{iteration distance}(k)} \quad \langle\text{Equation 1}\rangle$$

As shown in Equation 1 above, as the total sum of iteration distances of nodes included in the recurrence decreases, the initiation interval has a larger value. Hence, the recurrence search unit 220 may search for recurrences of which a total sum of iteration distances is less than a critical value from among recurrences within the data dependency graph, and the scheduling unit 240 may enhance the performance of the software pipelining by first scheduling the found recurrence.

According to an exemplary embodiment, the recurrence search unit 220 may use 1 or 2 as the critical value.

Figure 5:
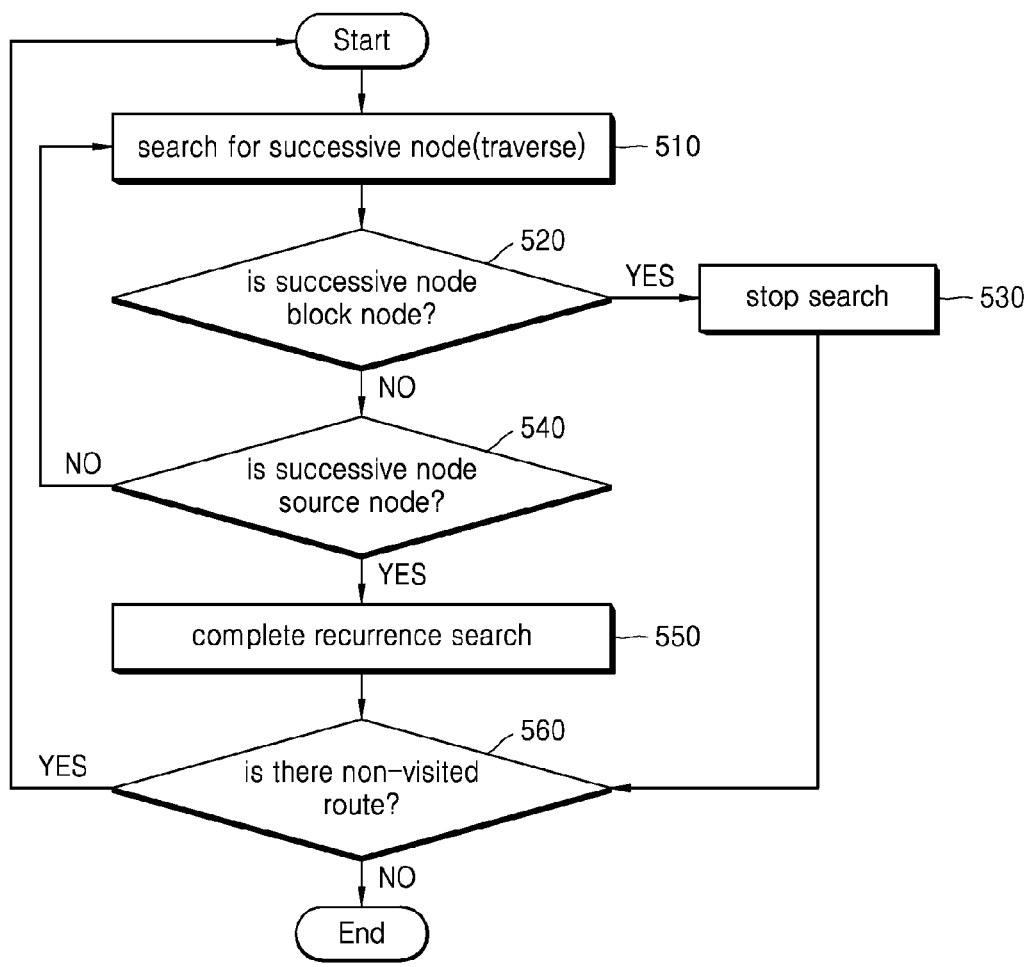
FIG. 5 illustrates a method of searching for a recurrence, the method performed by a modulo scheduling apparatus, in a data dependency graph, according to an exemplary embodiment.

FIG. 5 illustrates a method of searching for a recurrence, the method performed by a modulo scheduling apparatus, in a data dependency graph, according to an exemplary embodiment.

According to an exemplary embodiment, the modulo scheduling apparatus 200 may use a data structure such as a stack, a queue, and a connection list in order to store a successor node of the currently visited node. The modulo scheduling apparatus 200 may store the successor node of the currently visited node in a stack. Hereinafter, a set of nodes, which have been visited up to the current time, i.e., the found route, is called "Path". In the initiation operation, the Path includes only the source node.

In operation S510, a successor node of a currently visited node may be searched for. According to an exemplary embodiment, in operation S510, the list of successor nodes and all outgoing edges (also referred to as "lines") may be found, and at this time, if there are a plurality of non-visited successor nodes, the order of the search may be determined by using a data structure such as a stack.

In operation S520, it may be determined whether the successor node corresponds to a block node. If the successor node corresponds to the block node, the method proceeds to operation S530, and otherwise, the method proceeds to operation S540. In operation S520, if there is no route for reaching the source node from the successor node or the successor already corresponds to the node which is included in the Path, it may be determined that the successor node corresponds to the block node.

In operation S530, if the successor node is the block node, a search operation stops because, even if the successor node is visited, there is no route to return to the source node.

In operation S540, it may be determined whether the successor node, with respect to which a search was tried, is a source node. If the successor node is the source node, the recurrence has been found, and thus, the method proceeds to operation S550, and otherwise, the method proceeds to S510 so that a continuous search may be performed after visiting the successor node.

In operation S550, the stored route may be determined as a recurrence so as to be output.

In operation S560, it is determined whether there is a route which has not been searched for, and if there is such a route, the method returns to the starting operation so as to try a search and if all routes have been searched for, the search may be terminated. That is, it is determined whether the successor node has been visited for all nodes existing in the data dependency graph, and if there is a successor node which has not been visited, a search may be performed in a successor node direction, and otherwise, the search may be terminated. According to an exemplary embodiment, whether the successor node has been visited may be recorded by using a flag, and the visited node may be popped in the stack until a node having a non-visited successor node appears.

Hereinafter, an example of a method of searching for a recurrence, by the module scheduling method, in the data dependency graph 400 of FIG. 4 will be described with reference to the flowchart of the modulo scheduling method of FIG. 5.

The module scheduling apparatus 200 may reflectively visit a successor node via an outgoing edge of node B 420 while using node A 410 as the source node, and may visit the successor node by using a directed path from node A 410 to node D 440. The modulo scheduling apparatus 200 may first try a search in the direction of node B 420. In the initiation step, the Path includes only the source node, and thus, Path={A}.

Node B 420 does not correspond to a block node or a source node (S520 and S540), and thus, the modulo scheduling apparatus 200 may continually perform a search (S510). Path={A, B}.

Node B 420 has node F 460 and node C 430 as successor nodes. The modulo scheduling apparatus 200 may try a search in the direction of node F 460. Node F 460 does not correspond to the block node or source node (S520 and S540), and thus, the modulo scheduling apparatus 200 may continually perform a search (S510). Path={A, B, F}.

Node F 460 has node A 410 as the successor node, and thus, the modulo scheduling apparatus 200 may try a search in the direction of node A 410. Node A 410 is not the block node (S520), but node A 410 corresponds to the source node (S540). Hence, Path={A, B, F, A}, and the modulo scheduling apparatus 200 may determine the Path as the recurrence so as to be output (S550). The search for one recurrence is terminated.

The modulo scheduling apparatus 200 has not yet searched for a route from node B 420 to node C 430 (S560), and thus a search in the direction of node C 430 may be tried after returning to node B 420. Node C 430 does not correspond to the block node or source node (S520 and S540), and thus, the search may be continually performed (S510). Path={A, B, C}.

The modulo scheduling apparatus 200 may continually try a search to node D 440, which is the successor node of node C 430 (S510). Node D 440 does not correspond to the block node or source node (S520 and S540), and thus, the modulo scheduling apparatus 200 may continually perform a search (S510). Path={A, B, C, D}.

Node D 440 includes only node B 420, which is already included in the route, as the successor node, and thus, node D 440 corresponds to the block node (S520). Hence, the modulo scheduling apparatus 200 may display node D as the block node and stop the search (S530).

However, the search in the direction of node E 450 from node C 430 has not yet been performed (S560), and thus, the modulo scheduling apparatus 200 may return to node C 430 and continually perform a search in the direction of node E 450 (S510). Node E 450 is not the block node and does not correspond to the source node (S520 and S540), and thus, the modulo scheduling apparatus 200 may continually perform a search (S510). Path={A, B, C, E}.

The modulo scheduling apparatus 200 may try a search to node D 440. However, node D 440 is a block node, and thus no more searching is needed. Hence, the search is stopped (S530).

The route, which is directed from node A 410 to node D 440, has not yet been searched (S560), and thus, the modulo scheduling apparatus 200 may return to node A 410 and try a search in the direction of D 440. As the modulo scheduling apparatus 200 returns to node A 410, node B 420 has been deleted in the Path, and thus, node B 420 and node D 440, of which a route has been blocked by node B 420, may be released (hereinafter, referred to as "unblocked") from the block node. That is, node B 420 and node D 440 are no longer a block node.

Node D 440 does not correspond to the source node or block node (S520 and S540), and thus, the modulo scheduling apparatus 200 may continually perform a search (S510). Path={A, D}. A search for node D 440 in the direction of successor node B 420 may be continually tried (S510).

The modulo scheduling apparatus 200 may visit node B 420 and repeat the above-described operations S520, S540, S550, and S510, and Path={A, D, B, F, A} may be determined as a recurrence so as to be output. Thus, all routes have been found (S560), and thus, the modulo scheduling apparatus 200 may terminate the search.

According to an exemplary embodiment, the method illustrated in the flowchart of FIG. 5 may be performed in the recurrence search unit 220 of the modulo scheduling apparatus 200, but an embodiment is not limited thereto.

Figure 6:
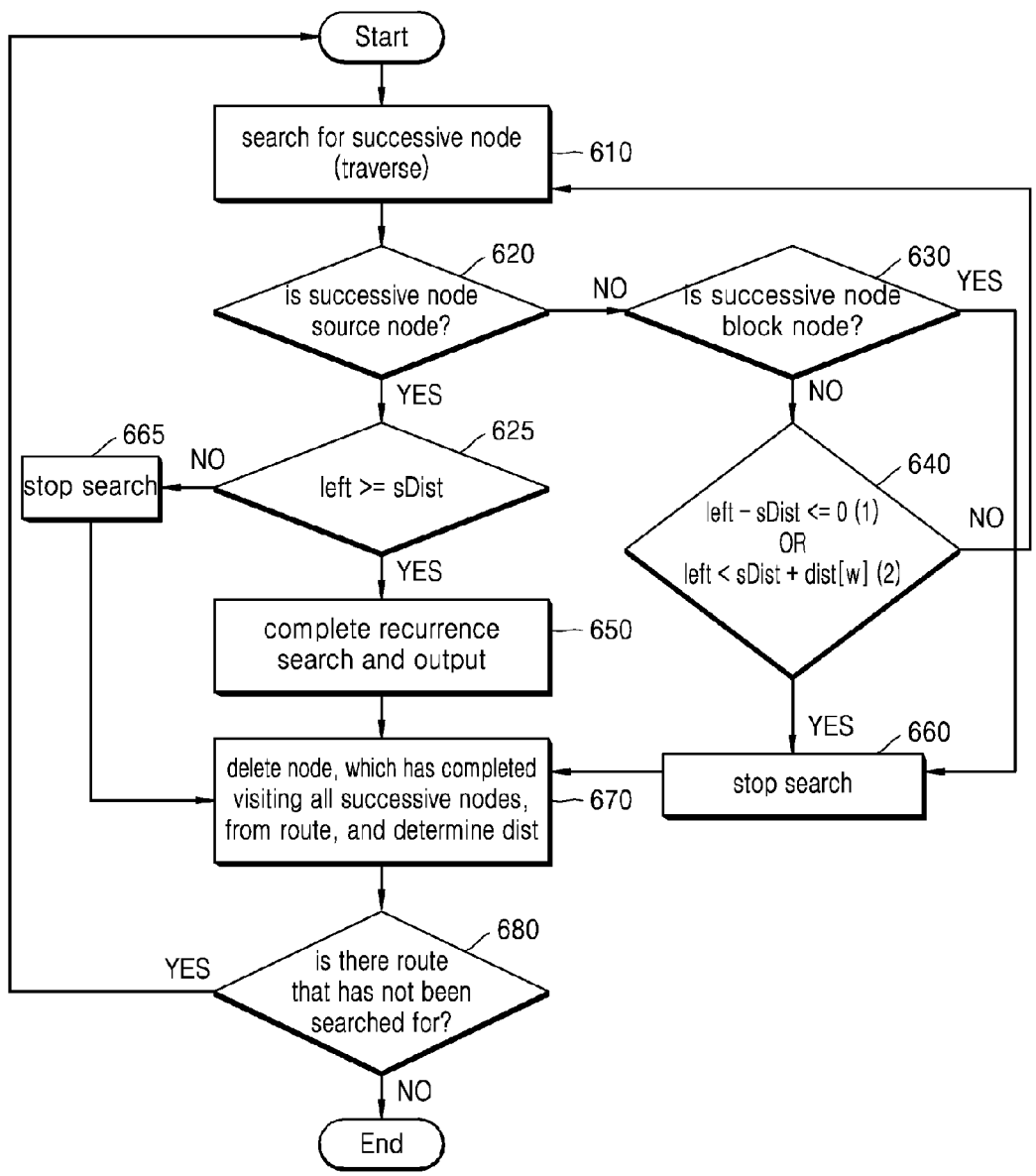
FIG. 6 illustrates a method of searching for a recurrence, the method performed by a modulo scheduling apparatus, in a data dependency graph, according to an exemplary embodiment.

FIG. 6 illustrates a method of searching for a recurrence, the method performed by a modulo scheduling apparatus, in a data dependency graph, according to an exemplary embodiment.

According to an exemplary embodiment, the modulo scheduling apparatus 200 may reduce the time and costs which are spent in searching for a recurrence by selectively searching for certain recurrences having an MII that is relatively long instead of searching for all recurrences in the data dependency graph.

MII is the total sum of latencies of all trunks of a recurrence divided by the total sum of initiation distances, and thus, as the total sum of iteration distances of nodes included in the recurrence decreases, the MII increases.

According to an exemplary embodiment, the modulo scheduling apparatus 200 may search for recurrences of which an iteration distance is a predetermined critical value or less. The modulo scheduling apparatus 200 may visit nodes in the initial listed order of commands included in the loop.

Hence, if the modulo scheduling apparatus 200 determines a command which exists first in the loop as the source node and starts a search, at least one iteration distance is needed in order to return to the source node from a currently visited arbitrary node.

According to an exemplary embodiment, the modulo scheduling apparatus 200 may stop a search when there is no currently available iteration distance in order to narrow the scope of the search and decrease search results.

According to an exemplary embodiment, the modulo scheduling apparatus 200 may set a variable called "dist". Dist[w] refers to the number of iteration distances which exist in the route which may reach the source node. Hence, if dist[w] is infinite, the dist[w] indicates that there is no route from current node w to the source node.

When dist[w] has a positive value k, which is not infinite, it may not be understood whether there is a route from node w to the source node, but when there is a route, it is understood that it is possible to return to the source node only after passing through at least k iteration distances.

No node has been visited before the modulo scheduling apparatus 200 starts a recurrence search, and thus, dist information of all nodes does not exist.

According to an exemplary embodiment, the modulo scheduling apparatus 200 may set a variable "left" and store the above-described available iteration distance in the "left". That is, the modulo scheduling apparatus 200 may initialize the "left" as a predetermined critical value and gradually reduce the iteration distances until the current node is visited starting from the source node.

In other words, the "left" refers to the iteration distance which may be currently used by the modulo scheduling apparatus 200, and if the iteration distance, which is consumed in the route from the current node in the direction of a certain successor node, exceeds the available iteration distance (left), the route does not correspond to a recurrence having an iteration distance of a critical value or less, and thus, the modulo scheduling apparatus 200 may stop a search in the direction of the successor node.

The module scheduling apparatus 200 may set a variable called sDist. sDist refers to the iteration distance which is consumed when the modulo scheduling apparatus 200 visits the successor node in the current visited node. In other words, sDist refers to the iteration distance which exists in the trunk between the currently visited node and the successor node.

The modulo scheduling apparatus 200 may set a list "block2". The currently visited node v only has node w, which has already been stored in the route, as the successor node, and thus, when the search stops at node w, the block2[w] list may store node v in block2[w]. For example, when the set of nodes, which have been visited up to the current time, i.e, a search route, is called "Path", if the successor node w of node v is a node which belongs to the Path, v may be stored in block2[w]. If node w is deleted from the Path, the dist of the v is initialized and may be unblocked in the block node.

The modulo scheduling apparatus 200 may sequentially perform a search in the direction of the successor node, starting from the source node. For example, when there are three nodes, namely, node X, node Y, and node Z, as the successor nodes of the source node, a recurrence search may be performed in the order of directions of node Z, node Y, and node X.

The modulo scheduling apparatus 200 may use a data structure such as a stack, a queue, and a connection list in order to store the successor node of the currently visited node, but an embodiment is not limited thereto. When the modulo scheduling apparatus 200 starts a recurrence search in the direction of node Z from the source node, it is obvious that the successor node of node Z may be recursively visited by using the method illustrated in the flowchart of FIG. 6.

In operation S610, the successor node of the current node may be searched for. According to an exemplary embodiment, the modulo scheduling apparatus 200 may check a list of successor nodes which have not been visited, and at this time, when there are a plurality of non-visited successor nodes, the order of the search may be determined by using the data structure such as a stack.

In operation S620, it is determined whether the successor node of the current node corresponds to the source node, and if the node corresponds to the source node, the method proceeds to operation S625, and otherwise, the method proceeds to operation S630 where it is checked whether the successor corresponds to the block node.

In operation S625, it is determined whether the available iteration distance (left) is the same as or greater than the iteration distance (sDist) between the current node v and the successor node w. If the condition of operation S625 is satisfied, the method proceeds to operation S650, and otherwise, the method proceeds to operation S665. If the available iteration distance (left) is less than the iteration distance (sDist) between current node v and the successor node w, the successor node w is not visited because the sum of the iteration distances existing in the route exceeds a predetermined critical value even if the successor node w is the source node v.

In operation S650, the modulo scheduling apparatus 200 may determine the route up to the current point of time as a recurrence so as to output the route.

In operation S665, the search cannot be performed in the direction of the successor node w with the current available iteration distances, and thus, the search may be stopped.

In operation S670, the node, of which all successor nodes have been visited, is deleted from the route, and the dist of the deleted node may be determined. That is, if the visit of all successor nodes of the current node v has been completed, the node v may be deleted from the route, and the dist (i.e., dist[v]) of the node v may be determined. In operation S670, the modulo scheduling apparatus 200 may store the minimum value from among the sum of dist values of respective successor nodes of the current node v and the iteration distances existing in the trunks of respective successor nodes, as dist[v].

For example, when there are current node v and successor nodes s1 and s2, a smaller value among dist[s1]+<v, s1> and dist[s2]+<v, s2> may be stored in dist[v]. <v, s1> and <v, s2> refers to an iteration distance between each node v and successor nodes s1 and s2. The stored dist[v] value may be used in determining whether to stop a search in operation S640. If there is no route from the current node v to the source node, dist[v] may be set as infinite (a sufficiently large number in the implementation).

If the visit of all successor nodes has been completed, the method may proceed to operation S680 so as to determine whether there is still a route which has not been searched.

In operation S680, it is determined whether there is a route which has not been searched for, and if there is such a route, the method returns to the initial operation so as to try a search, and if all routes have been searched for, the search may be terminated. That is, it is determined whether the successor nodes of all nodes existing in the data dependency graph have been visited, and if there are non-visited successor nodes, a search may be performed in the direction of the successor node, and otherwise, the search may be terminated. According to an exemplary embodiment, whether the successor nodes have been visited may be recorded by using a flag, and the visit-completed nodes may be popped from the stack until a node having a non-visited successor node appears by using a data structure such as a stack.

In operation S630, it is determined whether the successor node corresponds to the block node, and if the successor node is the block node, the method proceeds to operation S660, and otherwise, the method proceeds to operation S640 so as to determine whether a predetermined condition is satisfied. That is, if there is no route for the successor node w of the current node v to reach the source node (dist[w] is infinite), or node w is a node which is already included in the Path, the node w may be determined as the block node. If the successor node is the block node, there is no route for trying a further search even if the successor node is visited, and thus, the search in the direction of the successor node is stopped.

In operation S660, if the successor node w is the block node, the search in the direction of the successor node w may be stopped. Further, if the successor node w corresponds to the already stored node, the currently visited node v may be stored in the block2[w]. However, if node w does not correspond to the block node, the condition of operation S640 may be determined.

In operation S640, it may be determined whether to continue a search in the direction of the successive node by determining a predetermined condition by using the above-described dist, left, and sDist variables. If predetermined conditions (1) and (2) are satisfied, a search may be stopped by proceeding to operation S660, and the method may proceed to operation S670. Otherwise, the method may proceed to operation S610 so that the successive node is visited and the search is continued.

In operation S640, it may be determined whether the left−sDist is 0 or less (condition (1)). As described above, "left" is a variable which stores a currently available iteration distance, and thus, if the left−sDist is 0 or less, it means that a desired recurrence (i.e., a recurrence having an iteration distance of a critical value or less) cannot be found when the desired recurrence is searched for in the direction of the successive node.

For example, when the left is 1 and sDist is 1, the maximum iteration distance may be used until the source node is reached from the current node v, and one iteration distance is used when visiting the successive node (because sDist is 1), and thus, the value of the left at the time of visiting the successive node w becomes 0.

However, as described above, in order to return from an arbitrary node to the source, at least one iteration distance is needed, and thus at least one iteration distance needs between the successive node and the source node. Hence, in operation S660, the modulo scheduling apparatus 200, of which an iteration distance (left) is 0, may stop a search in the direction of the successive node w which satisfies Equation 1 of operation S640.

In operation S640, when dist information is stored in the successive node w, it may be determined whether the left is less than sDist+dist[w] (condition (2)).

When visiting the successive node w from the current node v, the iteration distance of as much as the sDist is consumed, and the route of returning to the source node from the successive node w requires the iteration distance of as much as the dist[w]. Hence, if the available iteration distance "left" is less than sDist+dist[w], it means that a desired recurrence (i.e., a recurrence having an iteration distance of a critical value or less) cannot be found when the desired recurrence is searched for in the direction of the successive node. Hence, in operation S660, the modulo scheduling apparatus 200 may stop a search without visiting the successive node w.

In operation S670, it was described above that the dist value, which has been determined by visiting all successive nodes, may remain in order to be used when performing a search by using another route. However, as the block node is released as an unblock node in the recurrence search method which has been described with reference to FIG. 5, there may be a case where the dist[v] value may need to be deleted in order to search for another route.

According to an exemplary embodiment, in operation S670, if node u is deleted in the current route, the nodes, which are included in the block2[u] list, are unblocked, and the disk information may be deleted. According to an exemplary embodiment, when popped in the stack in the modulo scheduling apparatus 200, the nodes, which are included in the block2[u], may be unblocked and the disk information may be deleted, but an embodiment is not limited thereto. Hence, the modulo scheduling apparatus 200 may find a route for reaching the source node through node w when visiting node w from which dist information has been deleted again later.

According to an exemplary embodiment, the method illustrated in the flowchart of FIG. 6 may be performed in the recurrence search unit 220 of the modulo scheduling apparatus 200, but an embodiment is not limited thereto.

Figure 7:
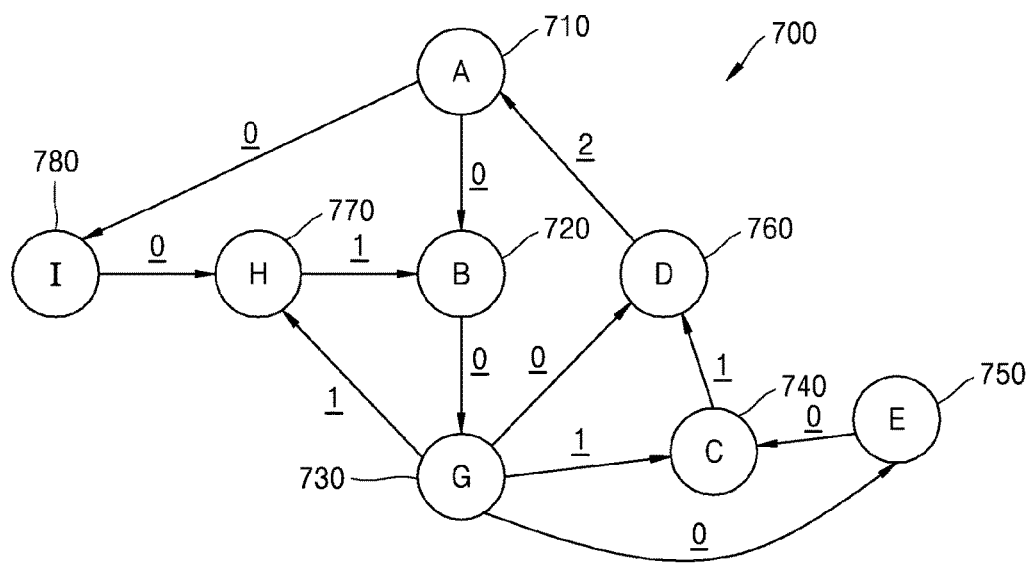
FIG. 7 illustrates iteration dependence in a data dependency graph according to an exemplary embodiment.

FIG. 7 illustrates iteration dependence in a data dependency graph 700 according to an exemplary embodiment. The latency, which exists between nodes in FIG. 7, has been omitted for the convenience of description. Hereinafter, a method of searching for a recurrence having an iteration distance of a critical value or less, the method performed by the modulo scheduling apparatus 200, in the graph of FIG. 7 will be described by using the flowchart of FIG. 6.

It is assumed that the critical value of the iteration distance of the recurrence to be searched for is 2. Hence, the modulo scheduling apparatus 200 may selectively search for only recurrences of which an iteration distance is 2 or less in the data dependency graph 700.

Because the critical value is 2, the initial value of the available iteration distance (left) is 2, and the modulo scheduling apparatus 200 may perform reduction by the iteration distance existing in the trunk (i.e., the iteration distance existing between nodes) while performing a search. The iteration distance existing in the trunk has been displayed on the trunk. That is, the iteration distance, which is needed in reaching node B 720 from node A 710, is 0. Further, the iteration distance, which is needed in reaching node A 710 from node D 760, is 2. The modulo scheduling apparatus 200 may store the current search route in the Path. The starting point is the source node A 710, and thus, in the starting point, Path={A}.

The modulo scheduling apparatus 200 may first try a search with successive node I 780 of source node A 710 and node B 720. Node B 720 does not correspond to the source node or block node (S620 and S630) and does not correspond to the conditions (1) and (2) of operation S640, and thus, the visit of node B may be possible.

The modulo scheduling apparatus 200 may search with the successive node G 730 of node B 720. Node G 730 also does not correspond to the source node or block node (S620 and S630) and does not correspond to the conditions (1) and (2) of operation of S640, and thus, the visit of node G may be possible. There is no iteration distance which has been consumed in visiting node G 730 via node B 720 after staring from source node A 710 by the module scheduling apparatus 200, and thus, the available iteration distance "left" is not reduced from initial value 2, and the Path is {A, B, G}.

The modulo scheduling apparatus 200 may search with node D 760 from among successive node D 760, successive node C 740, and successive node H 770 of node G 730. Node D 760 is neither the source node nor the block node (S620 and S630) and does not correspond to the conditions (1) and the (2) of operation S640, and thus, the modulo scheduling apparatus 200 may visit node D 760. Path={A, B, G, D}, and the available distance is 2.

The modulo scheduling apparatus 200 may search with the successive node A 710 of node D 760. Node A 710 corresponds to the source node (S620) and satisfies the condition of operation S625, and thus, Path={A, B, G, D, A}, and the modulo scheduling apparatus 200 may output the Path as a recurrence. The modulo scheduling apparatus 200 may update the dist of node D 760 as 2. The modulo scheduling apparatus 200 may display node B 720, node G, and node D included in the Path as the block node.

The modulo scheduling apparatus 200 may return to node G 730 and search with node C 740 from among non-visited successive node C 740 and successive node E of node G 730. As the modulo scheduling apparatus 200 returns to node G 730, node D 760 has been deleted from the Path and the dist of node D 760 is not infinite, and thus, node D 760 may be unblocked. Node C 740 does not correspond to the source node or block node (S620 and S630) and does not correspond to the condition of operation S640, and thus, the modulo scheduling apparatus 200 may visit node C 740. Path={A, B, G, C}. The modulo scheduling apparatus 200 may display node B 720, node G 730, and node C 740 included in the Path as the block node. The iteration distance, which is needed in reaching node C 740 from node G 730, is 1, and thus, the available iteration distance is reduced from 2 to 1. That is, "left" is 1.

The modulo scheduling apparatus 200 may conduct a search for a route directed to successive node D 760 from node C 740. Node D 760 is neither the source node nor the block node (S620 and S630). The iteration distance, which is needed in reaching node D 760 from node C 740, is 1. That is, "left" is 1 and sDist is 1, and thus left−sDist has a value of 0 or less, which corresponds to the condition (1) of operation S640. Further, dist[D] is 2, and thus, this corresponds to condition (2). Hence, the modulo scheduling apparatus 200 may stop searching in the direction of node D 760 (S660).

The modulo scheduling apparatus 200 may delete node C 740 and update the dist of node C 740 (i.e., dist[C]) as 3, and unblock node C 740 in order to return to node G 730.

The modulo scheduling apparatus 200 may conduct a search in the direction of the non-visited successive node E 750. Node E 750 does not correspond to the source node or block node (S620 and S630) and does not correspond to the condition of S640, and thus, the modulo scheduling apparatus 200 may visit node E 750. Path={A, B, G, E}.

The modulo scheduling apparatus 200 may conduct a search in the direction of the successive node C 740 of node E 750. However, the dist of node C 740 (i.e., dist[C]) has been set to 3, and thus, the modulo scheduling apparatus 200 may stop a search (S660) because this corresponds, not to condition (1), but to condition (2) of S640.

The modulo scheduling apparatus 200 may delete node E 750 and update the dist of node E (i.e., dist[E]), and unblock node E 750 in order to return to node G 730. The modulo scheduling apparatus 200 may search for a route from node G to non-visited node H 770. Node H 770 does not correspond to the source node or block node (S620 and S630) and does not correspond to the conditions (1) and (2) of S640, and thus, the modulo scheduling apparatus 200 may visit node H 770. Path={A, B, G, H}.

The modulo scheduling apparatus 200 may continually conduct a search in the direction of the successive node B 720. However, node B 720 has been already included in the route, and thus, node B 720 corresponds to the block node (S630). Hence, the modulo scheduling apparatus 200 may stop a search in the direction of node B 720 (S660) and store node H 720 having node B 720 as the only successive node in block2[B].

The modulo scheduling apparatus 200 has visited all successive nodes of node H 770, all successive nodes of node G 730, and all successive nodes of node B 720, and thus node H 770, node G 730, and node B 720 may be deleted in this order from the Path. The modulo scheduling apparatus 200 may not unblock node H 770 when deleting node H 770 and may unblock node H 770 stored in block2 [B] when deleting node B 720.

The modulo scheduling apparatus 200 may update the dist of node G (i.e., dist[G]) as 2 while deleting node G. Further, the modulo scheduling apparatus 200 may update the dist of node B (i.e., dist[B]) as 2 while deleting node B. The modulo scheduling apparatus 200 may unblock node B 720 and node G because the dist of each of node B and node G is not infinite. The modulo scheduling apparatus 200 may unblock node B 720 and node H 770 stored in block2[B] and initialize the dist of node H (i.e., dist[H]) while deleting node B 720 from the Path.

The modulo scheduling apparatus 200 may conduct a search in the direction of node I 780 from the source node A 710. At this time, node I 780 is neither the source node nor the block node and does not correspond to the conditions (1) and (2) of operation S640. It is obvious that the modulo scheduling apparatus 200 may reach node H 770 via node I 780, and thus, the detailed description thereof is omitted here. The available iteration distance (left) of the modulo scheduling apparatus 200, which is visiting node H 770, is 2, and Path={A, I, H}.

The modulo scheduling apparatus 200, which has visited node H 770, may search a route directed to node B 720. However, the dist of node B 720 is 2, which does not satisfy condition (2) of operation S640. Hence, the modulo scheduling apparatus 200 may stop a search in the direction of node B 720. The modulo scheduling apparatus 200 may delete and unblock node H 770 and node I 780 in this order from the Path and may update both dist[H] and dist[I] as 3.

The modulo scheduling apparatus 200 has searched for all successive nodes of node A 710, and thus, it may be determined that all routes within the data dependency graph 700 have been searched for (S680), and the search may be stopped.

The variable, data structure, the process of conditional sentences, and the order in the method of searching for only recurrences of which an iteration distance is a critical value or less in the description with reference to FIGS. 6 and 7 are merely examples and are not limitative, and thus it is understood that they may be executed in other specific forms without changing the technical concept or essential features.

Figure 8:
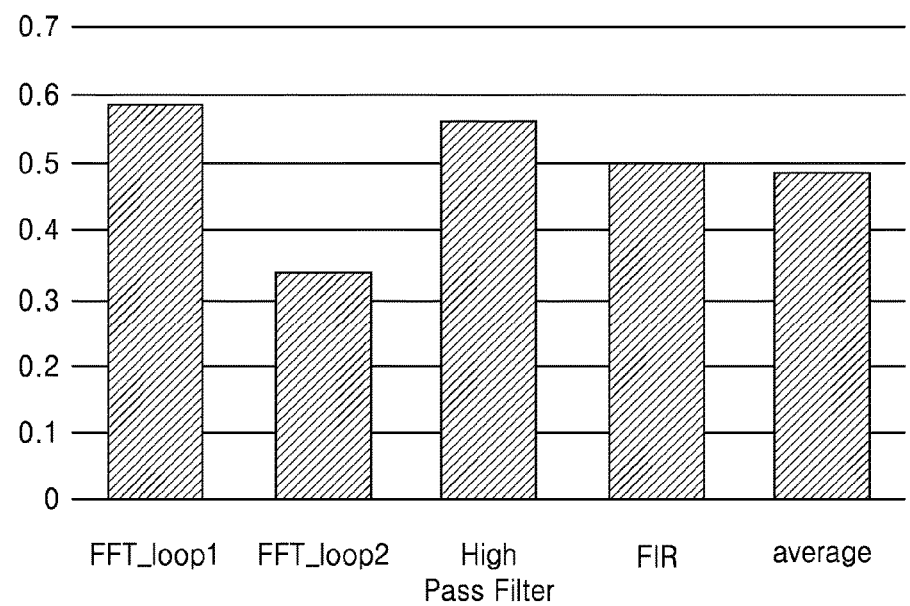
FIG. 8 illustrates a result of measuring performance by applying a modulo scheduling method according to an exemplary embodiment.

FIG. 8 illustrates a result of measuring performance by applying a modulo scheduling method according to an exemplary embodiment. The ratio of time consumed in a recurrence search in the total modulo scheduling time has been reduced from 84% to 49%. Further, in the case of FFT_loop2, the time consumed in the recurrence search is 5.72 ms. Hence, it is understood that the recurrence search time has been reduced by about 5000 times and the total modulo scheduling time has been reduced by about 1900 times.

The modulo scheduling method and apparatus according to an exemplary embodiment may be applied when a loop is accelerated through software pipelining such as iterative modulo scheduling and swing modulo scheduling. Hence, the modulo scheduling method and apparatus may be applied to all architecture processors such as a scalar processor, a superscalar processor, a very long instruction word (VLIW) process, and a coarse-grained reconfigurable architectures (CGRA) processor. Further, the modulo scheduling method and apparatus may be applied to all kinds of processors such as a central processing unit (CPU), a graphics processing unit (GPU), a digital signal processor (DSP), an application specific instruction processor (ASIP), and a micro controller.

The method, process, apparatus, product, and/or system according to an exemplary embodiment are simple, cost-effective, various, and accurate. Further, efficient and economical production, application, and utilization may be implemented by applying known components to the process, apparatus, product, and system according to the exemplary embodiment, thereby enhancing the level of current technology.

In addition, other exemplary embodiments can also be implemented through computer-readable code/instructions in/on a medium, e.g., a computer-readable medium, to control at least one processing element to implement any above-described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A modulo scheduling apparatus comprising:
a memory configured to store a program; and
a processor configured to execute the program to:
conduct a search, based on a data dependency graph of a loop, for a recurrence in which a sum of iteration distances between command nodes is less than a predetermined critical value;
determine a processing order of the recurrence; and
perform scheduling with a priority in the recurrence based on the recurrence having the sum of iteration distances between command nodes that is less than the predetermined critical value,
wherein, when a source node is S, the searched recurrence is a route that starts from the source node S and returns to the source node S, and the processor is further configured to initialize an available iteration distance as the critical value before starting the search, update the available iteration distance in response to the iteration distance being reduced while searching for the recurrence in a direction of one or more successive nodes of the source node S, and stop the search if the available iteration distances become less than 0, and
wherein the processor is further configured to recursively visit a non-visited successive node in response to the search stopping.

2. The modulo scheduling apparatus of claim 1, wherein the processor is further configured to obtain the data dependency graph indicating dependency between the command nodes included in the loop.

3. The modulo scheduling apparatus of claim 1, wherein the iteration distances correspond to a number of iterations that separate two operation instances of a same command node between which dependency exists in the loop.

4. The modulo scheduling apparatus of claim 1, wherein, when a currently visited node is V, a successive node of the node V is a node W, and an iteration distance existing between the node V and the node W is D, the processor is further configured to stop conducting the search in a direction of the node W in response to the node W not corresponding to the source node S and the available iteration distance being D or less.

5. The modulo scheduling apparatus of claim 1, wherein, when a currently visited node is V, a successive node of the node V is a node W, an iteration distance existing between the node V and the node W is D, and a sum of iteration distances existing on a route to reach the source node S from the node W is A, the processor is further configured to stop conducting the search in a direction of the node W in response to the available iteration distance being less than a sum of D and A.

6. The modulo scheduling apparatus of claim 1, wherein, when a currently visited node is V, a successive node of the node V is a node W, the processor is further configured to stop conducting the search in a direction of the node W in response to the node W not corresponding to a source node and the node W being stored in a route of a current point of time.

7. The modulo scheduling apparatus of claim 1, wherein the processor is further configured to perform scheduling one or more recurrences searched in an order of a largest minimum initiation interval (MII) to a smallest MII,
wherein the MII is a minimum interval which is needed in repeatedly processing each of the recurrences.

8. A modulo scheduling method comprising:
conducting, by a device, a search, based on a data dependency graph of a loop, for a recurrence in which a sum of iteration distances between command nodes is less than a predetermined critical value;
determining, by the device, a processing order of the recurrence; and
performing scheduling with a priority in the recurrence based on the recurrence having the sum of iteration distances between command nodes that is less than the predetermined critical value,
wherein, when a source node is S, the searched recurrence is a route that starts from the source node S and returns to the source node S, and the conducting the search further comprises initializing, by the device, an available iteration distance as the critical value before starting the search, updating, by the device, the available iteration distance in response to the iteration distance being reduced while searching for the recurrence in a direction of one or more successive nodes of the source node S while reducing the iteration distance, and stopping, by the device, the search in response to the available iteration distances become less than 0, and
wherein the conducting the search further comprises recursively visiting, by the device, a non-visited successive node in response to the search stopping.

9. The modulo scheduling method of claim 8, further comprising obtaining, by the device, the data dependency graph that indicates dependency between the command nodes included in the loop.

10. The modulo scheduling method of claim 9, wherein, when a currently visited node is V, a successive node of the node V is W, the conducting the search further comprises stopping, by the device, the search in a direction of the node W in response to the node W not corresponding to a source node and the node W being stored in a route up of a current point time.

11. The modulo scheduling method of claim 9, wherein the determining the processing order comprises scheduling, by the device, one or more recurrences found by the conducting the search in an order of a largest minimum initiation interval (MII) to a smallest MII,
wherein the MII is a minimum interval which is needed in repeatedly processing each of the recurrences.

12. The modulo scheduling method of claim 8, wherein, when a currently visited node is V, a successive node of the node V is a node W, and an iteration distance existing between the node V and the node W is D, the conducting the search further comprises stopping, by the device, the search in a direction of the node W in response to the node W not corresponding to the source node S and the available iteration distance being D or less.

13. The modulo scheduling method of claim 8, wherein, when a currently visited node is V, a successive node of the node V is a node W, an iteration distance existing between the node V and the node W is D, and a sum of iteration distances existing on a route to reach the source node S from the node W is A, the conducting search further comprises stopping, by the device, the search in a direction of the node W in response to the available iteration distance being less than a sum of D and A.

14. A non-transitory computer-readable recording medium storing a program that is executable by a computer to perform the method of claim 8.

* * * * *